United States Patent
Gaur et al.

(10) Patent No.: US 7,873,049 B2
(45) Date of Patent: Jan. 18, 2011

(54) MULTI-USER MAC PROTOCOL FOR A LOCAL AREA NETWORK

(75) Inventors: Sudhanshu Gaur, Burlingame, CA (US); Clifford Tavares, San Diego, CA (US)

(73) Assignee: Hitachi, Ltd., Tokyo (JP)

( * ) Notice: Subject to any disclaimer, the term of this patent is extended or adjusted under 35 U.S.C. 154(b) by 1168 days.

(21) Appl. No.: 11/477,727

(22) Filed: Jun. 28, 2006

(65) Prior Publication Data

US 2008/0002636 A1    Jan. 3, 2008

(51) Int. Cl.
H04L 12/56    (2006.01)

(52) U.S. Cl. .................. 370/392; 370/418; 370/462; 370/475

(58) Field of Classification Search .............. 370/417, 370/418
See application file for complete search history.

(56) References Cited

U.S. PATENT DOCUMENTS

| | | | | |
|---|---|---|---|---|
| 6,067,301 | A * | 5/2000 | Aatresh ................. | 370/418 |
| 7,277,446 | B1 * | 10/2007 | Abi-Nassif et al. ........ | 370/412 |
| 7,606,927 | B2 * | 10/2009 | Tasman et al. ............ | 709/232 |
| 2002/0163879 | A1 * | 11/2002 | Li et al. ................ | 370/200 |
| 2004/0170186 | A1 * | 9/2004 | Shao et al. .............. | 370/412 |
| 2005/0025167 | A1 * | 2/2005 | Ishibashi et al. ......... | 370/412 |
| 2005/0032521 | A1 * | 2/2005 | Lee et al. ............... | 455/450 |
| 2005/0043031 | A1 * | 2/2005 | Cho et al. ............... | 455/450 |
| 2005/0152373 | A1 * | 7/2005 | Ali .................... | 370/395.4 |
| 2005/0270977 | A1 * | 12/2005 | King et al. ............... | 370/235 |
| 2006/0140112 | A1 * | 6/2006 | Ginzburg ................ | 370/229 |
| 2006/0165103 | A1 * | 7/2006 | Trudeau et al. .......... | 370/401 |
| 2006/0215593 | A1 * | 9/2006 | Wang et al. ............. | 370/315 |
| 2006/0215686 | A1 * | 9/2006 | Takeuchi ................ | 370/445 |
| 2006/0221920 | A1 * | 10/2006 | Gopalakrishnan et al. ... | 370/338 |
| 2006/0268716 | A1 * | 11/2006 | Wijting et al. ............ | 370/235 |
| 2007/0153754 | A1 * | 7/2007 | Shapira et al. ............ | 370/338 |

OTHER PUBLICATIONS

A. Bourdoux and N. Khaled, Joint TX-RX Optimisation for MIMO-SDMA Based on A Null-space Constraint, IEEE VTC 2002-Fall, vol. 1, pp. 171-174, 2002.

(Continued)

Primary Examiner—Daniel J Ryman
Assistant Examiner—Brian Roberts
(74) Attorney, Agent, or Firm—Mattingly & Malur, P.C.

(57) ABSTRACT

A system comprises a station manager for associating a queue block to each active station in a network, each queue block being configured to implement a contention-based process, e.g., IEEE 802.11e, to select a winning frame from a set of frames; a multiplexer for receiving frames, each frame having a destination address, and for routing each received frame to a queue block based on the destination address; an access controller for receiving the winning frame from each queue block, for forwarding the winning frame(s) to a physical layer for simultaneous transmission to the active station(s) when the number of winning frames is equal to or below a threshold greater than one, and for forwarding a subset of the winning frames to the physical layer for simultaneous transmission to the active stations when the number of winning frames is above the threshold; and a physical layer capable of simultaneous frame transmission.

10 Claims, 8 Drawing Sheets

OTHER PUBLICATIONS

Institute of Electrical and Electronics Engineers, Inc., LAN/MAN Committee of the IEEE Computer Society, Standard for Information Technology-Telecommunications and Information Exchange between System-Local and Metropolitan Area Networks-Specific Requirements, Part 11: Wireless LAN Medium Access Control (MAC) and Physical Layer (PHY) Specifications: Amendment: Medium Access Control (MAC) Quality of Service (QoS) Enhancements; Copyright 2004, IEEE P802.11e/D13.0, Jan. 2005 (198 pages).

IEEE P802.11n/D1.0, Draft Amendment of Standard [FOR] Information Technology-Telecommunications and information exchange between systems-Local and Metropolitan networks-Specific requirements-Part 11: Wireless LAN Medium Access Control (MAC) and Physical Layer (PHY) specifications: Enhancements for Higher Throughput; Copyright 2006, IEEE P80211n/D1.0, Mar. 2006 (335 pages).

* cited by examiner

MULTI-USER MAC PROTOCOL FOR A LOCAL AREA NETWORK

COPYRIGHT AND TRADEMARK NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates generally to networks, and more particularly provides a system and method implementing multiple sub-blocks in the MAC layer of an access point to exploit parallel multiple access (e.g., SDMA or FDMA) in the physical layer of the access point.

BACKGROUND

As users experience the convenience of wireless connectivity, they are demanding increasing support. Typical applications over wireless networks address include video streaming, video conferencing, distance learning, etc. Because wireless bandwidth availability is restricted, quality of service (QoS) management is increasingly important in 802.11 networks. IEEE 802.11e proposes to define QoS mechanisms for wireless gear that gives support to bandwidth-sensitive applications such as voice and video.

The original 802.11 media access control (MAC) protocol was designed with two modes of communication for wireless stations. The first mode, Distributed Coordination Function (DCF), is based on Carrier Sense Multiple Access with Collision Avoidance (CSMA/CA), sometimes referred to as "listen before talk." A station waits for a quiet period on the network and then begins to transmit data and detect collisions. The second mode, Point Coordination Function (PCF), supports time-sensitive traffic flows. Wireless access points periodically send beacon frames to communicate network identification and management parameters specific to the wireless network. Between sending beacon frames, PCF splits the time into a contention-free period and a contention period. A station using PCF transmits data during contention-free periods.

Because DCF and PCF do not differentiate between traffic types or sources, IEEE proposed enhancements to both coordination modes to facilitate QoS. These changes are intended to fulfill critical service requirements while maintaining backward-compatibility with current 802.11 standards.

Enhanced Distribution Coordination Access (EDCA) introduces the concept of traffic categories. Using EDCA, stations try to send data after detecting that the medium is idle for a set time period defined by the corresponding traffic category. A higher-priority traffic category will have a shorter wait time than a lower-priority traffic category. While no guarantees of service are provided, EDCA establishes a probabilistic priority mechanism to allocate bandwidth based on traffic categories.

The IEEE 802.11e EDCA standard provides QoS differentiation by grouping traffic into four access classes (ACs), i.e. voice, video, best effort and background. Each frame from the upper layers bears a priority value (0-7), which is passed down to the MAC layer. Based on the priority value, the frames are mapped into the four ACs at the MAC layer. The voice AC has the highest priority; the video AC has the second highest priority; the best effort AC has the third highest priority; and the background AC has the lowest priority. Each AC has its own transmission queue and its own set of medium access parameters. Traffic prioritization uses the medium access parameters—AIFS interval, contention window (CW), and transfer opportunity (TXOP)—to ensure that a higher priority AC has relatively more medium access opportunity than a lower priority AC.

Generally, the arbitration interframe space (AIFS) is the time interval that a station must sense the medium to be idle before invoking a backoff or transmission. A higher priority AC uses a smaller AIFS interval. The contention window (CW, CWmin and CWmax) indicates the number of backoff time slots until the station can access the medium. CW starts from CWmin and doubles every time a transmission fails until it reaches its maximum value CWmax. Then, CW holds its maximum value until the transmission exceeds its retry limit. A higher priority AC uses smaller CWmin and CWmax. The Transmission Opportunity (TXOP) indicates the maximum duration that an AC can be allowed to transmit frames after acquiring access to the medium. To save contention overhead, multiple frames can be transmitted within one acquired TXOP without any additional contention, as long as the total transmission time does not exceed the TXOP duration.

To reduce the probability of two stations colliding, because the two stations cannot hear each other, the standard defines a virtual carrier sense mechanism. Before a station initiates a transaction, the station first transmits a short control packet called RTS (Request To Send), which includes the source address, the destination address and the duration of the upcoming transaction (i.e. the data packet and the respective ACK). Then, the destination station responds (if the medium is free) with a response control packet called CTS (Clear to Send), which includes the same duration information. All stations receiving either the RTS and/or the CTS set a virtual carrier sense indicator, i.e., the network allocation vector (NAV), for the given duration, and use the NAV together with the physical carrier sense when sensing the medium. This mechanism reduces the probability of a collision in the receiver area by a station that is "hidden" from the transmitter station to the short duration of the RTS transmission, because the station hears the CTS and "reserves" the medium as busy until the end of the transaction. The duration information in the RTS also protects the transmitter area from collisions during the ACK from stations that are out of range of the acknowledging station. Due to the fact that the RTS and CTS are short frames, the mechanism reduces the overhead of collisions, since these frames are recognized more quickly than if the whole data packet was to be transmitted (assuming the data packet is bigger than RTS). The standard allows for short data packets, i.e., those shorter than an RTS Threshold, to be transmitted without the RTS/CTS transaction.

With these medium access parameters, EDCA works in the following manner: Before a transmitting station can initiate any transmission, the transmitting station must first sense the channel idle (physically and virtually) for at least an AIFS time interval. If the channel is idle after the AIFS interval, the transmitting station invokes a backoff procedure using a backoff counter to count down a random number of backoff time slots. The transmitting station decrements the backoff counter by one as long as the channel is sensed to be idle. Once the backoff counter reaches zero, the transmitting station initiates an RTS transmission and awaits a CTS transmission from the receiving station. If the transmitting station receives a CTS transmission from the receiving station, the transmitting station initiates the transaction. The station can initiate multiple frame transmissions without additional contention as long as the total transmission time does not exceed the TXOP duration.

If the transmitting station senses the channel to be busy at any time during the backoff procedure, the transmitting station suspends its current backoff procedure and freezes its backoff counter until the channel is sensed to be idle for an AIFS interval again. Then, if the channel is still idle, the transmitting station resumes decrementing its remaining backoff counter. After each unsuccessful transmission, CW doubles until CWmax. After a successful transmission, CW returns to CWmin. The level of QoS control for each AC is determined by the combination of the medium access parameters and the number of competing stations in the network.

The default EDCA parameter values used by non-AP QoS stations (QSTAs) are identified in the table below. A TXOP_Limit value of 0 indicates that a single MAC service data unit (MSDU) or MAC protocol data unit (MPDU), in addition to a possible RTS/CTS exchange or CTS to itself, may be transmitted at any rate for each TXOP.

TABLE

Default EDCA Parameter Set

| AC | $CW_{min}$ | $CW_{max}$ | AIFSN | TXOP_Limit (ms) for 802.11 g PHY |
|---|---|---|---|---|
| (0) AC_BK | 31 | 1023 | 7 | 0 |
| (1) AC_BE | 31 | 1023 | 3 | 0 |
| (2) AC_VI | 15 | 31 | 2 | 3.008 |
| (3) AC_VO | 7 | 15 | 2 | 1.504 |

IEEE 802.11e is suited to CSMA/CA networks where channel access is granted in a time division multiple access (TDMA) fashion. The MAC layer of the AP actively communicates with one user at a time, and is oblivious to the number of clients being served by the application layer.

FIG. 1 shows a block diagram of layers in a wireless access point 100 that employs a TDMA-based physical layer 105, in accordance with the prior art. The traffic from the upper layers 115, in this case from stations $STA_A$ and $STA_B$, is categorized into four queues 120 in the MAC layer 110 based on the corresponding AC of the frame. Each queue 120 may have frames destined for different users. The frames across the queues 120 contend for channel access as specified in IEEE 802.11e. At the end of a contention, the MAC layer 110 sends the winning frame to the PHY layer 105 for transmission.

FIG. 2 is a timing diagram 200 illustrating packet flow in a wireless network implementing a TDMA-based physical layer, in accordance with the prior art. The frame exchange timeline assumes two stations, namely, $STA_A$ and $STA_B$. $STA_A$ and $STA_B$ contend for access to the wireless medium. Frames are transmitted over the same shared physical channel and are separated in time to avoid collision. As shown, the AP sends a frame, $FRAME_f(A)$, to $STA_A$. Upon receipt, $STA_A$ waits a predetermined settle time $T_{ACK}$ before sending an acknowledgement $ACK_f(A)$ to the AP. Upon receiving the $ACK_f(A)$, the AP waits a predetermined settle time $T_{DATA}$ before sending the next frame, $FRAME_f(B)$, to $STA_B$. Like $STA_A$, $STA_B$ waits the settle time $T_{ACK}$ before sending an acknowledgement $ACK_f(B)$ to the AP.

Since TDMA does not exploit parallel multiple access, these prior art techniques are still inefficient. Systems and methods are needed that can exploit parallel multiple access in the physical layer.

SUMMARY

In one embodiment, a system and method implementing a multi-user MAC layer in a broadband wireless access network are provided. The multi-user MAC may support active communication links with multiple clients simultaneously, thus enabling seamless connectivity across the protocol stack, leading to reduced delay and jitter. The multi-user MAC may exploit a capability of the physical layer to support multiple parallel physical links, either on the same channel using SDMA techniques or on different channels using FDMA techniques or multiple radios, leading to increased throughput.

In one embodiment, a method comprises associating a queue block to each active station in a network; receiving frames, each frame having a destination address identifying an active station; routing each frame to a queue block based on the destination address; performing a contention-based process by each queue block having at least one frame; receiving a winning frame from each queue block that performs the contention-based process; when the number of winning frames is equal to or below a threshold greater than one, then forwarding the winning frame or frames to a physical layer for substantially simultaneous transmission to the active station or stations; and when the number of winning frames is above the threshold, then forwarding a subset of the winning frames to the physical layer for substantially simultaneous transmission to the active stations.

The method may be performed by a wireless access point, wherein the network includes a wireless network. The contention-based process may include an IEEE 802.11e process. The threshold may be related to the number of simultaneous channels available to the physical layer. The subset of the winning frames may include a number of frames equal to the threshold. The method may further comprise instantiating queue blocks based on the number of active stations. The method may further comprise forwarding another subset of winning frames to the physical layer for substantially simultaneous transmission to the active station during a subsequent time slot when the difference between the number of winning frames and the threshold is greater than the threshold. The method may further comprise forwarding the winning frames to the physical layer for substantially simultaneous transmission to the active station during a subsequent time slot when the difference between the number of winning frames and the threshold is less than or equal to the threshold. The method may further comprise associating with the winning frame to be forwarded to the physical layer a time offset that informs the active station when to send an acknowledgement ACK frame, thus enabling a time shared uplink for acknowledgement ACK frames without contention. When at least two winning frames to be forwarded to the physical layer have different sizes, one frame being smaller and one frame being larger, the method may further comprise appending dummy data to the smaller frame so that the smaller frame with dummy data is the same size as the larger frame.

In another embodiment, a system comprises a station manager for associating a queue block to each active station in a network, the station manager being capable of managing multiple active stations and multiple queue blocks, each queue block being configured to implement a contention-based process to select a winning frame from a set of frames;

a multiplexer for receiving frames, each frame having a destination address, and for routing each received frame to a queue block based on the destination address; an access controller for receiving the winning frame from each queue block, the access controller being configured to forward the winning frame or frames to a physical layer for simultaneous transmission to the active station or stations when the number of winning frames is equal to or below a threshold greater than one, the access controller being configured to forward a subset of the winning frames to the physical layer for simultaneous transmission to the active stations when the number of winning frames is above the threshold; and a physical layer capable of substantially simultaneous frame transmission, e.g., using SDMA or FDMA.

The system may include a wireless access point, wherein the network includes a wireless network. The contention-based process may include an IEEE 802.11e process. The threshold may be related to the number of simultaneous channels available to the physical layer. The subset of the winning frames may include a number of frames equal to the threshold. The station manager may instantiate queue blocks based on the number of active stations. The access controller may forward another subset of winning frames to the physical layer for substantially simultaneous transmission to the active station during a subsequent time slot when the difference between the number of winning frames and the threshold is greater than the threshold. The access controller may forward the winning frames to the physical layer for substantially simultaneous transmission to the active station during a subsequent time slot when the difference between the number of winning frames and the threshold is less than or equal to the threshold. The access controller may associate with the winning frame to be forwarded to the physical layer a time offset that informs the active station when to send an acknowledgement ACK frame, thus enabling a time shared uplink for acknowledgement ACK frames without contention. When at least two winning frames to be forwarded to the physical layer have different sizes, one frame being smaller and one frame being larger, the access controller may append dummy data to the smaller frame so that the smaller frame with dummy data is the same size as the larger frame.

In yet another embodiment, a system comprises means for associating a queue block to each active station in a network and for managing multiple active stations and multiple queue blocks, each queue block being configured to implement a contention-based process to select a winning frame from a set of frames; means for receiving frames, each frame having a destination address, and for routing each received frame to a queue block based on the destination address; means for receiving the winning frame from each queue block, for forwarding the winning frame or frames for simultaneous transmission to the active station or stations when the number of winning frames is equal to or below a threshold greater than one, and for forwarding a subset of the winning frames for simultaneous transmission to the active stations when the number of winning frames is above the threshold; and means for transmitting multiple frames substantially simultaneously.

DETAILED DESCRIPTION

The following description is provided to enable any person skilled in the art to make and use the invention, and is provided in the context of a particular application and its requirements. Various modifications to the embodiments are possible to those skilled in the art, and the generic principles defined herein may be applied to these and other embodiments and applications without departing from the spirit and scope of the invention. Thus, the present invention is not intended to be limited to the embodiments shown, but is to be accorded the widest scope consistent with the principles, features and teachings disclosed herein.

In one embodiment, a system and method implementing a multi-user MAC layer in a broadband wireless access network are provided. The multi-user MAC may support active communication links with multiple clients simultaneously, thus enabling seamless connectivity across the protocol stack, leading to reduced delay and jitter. The multi-user MAC may exploit a capability of the physical layer to support multiple parallel physical links, either on the same channel using SDMA techniques or on different channels using FDMA techniques or multiple radios, thus leading to increased throughput.

Figure 1:
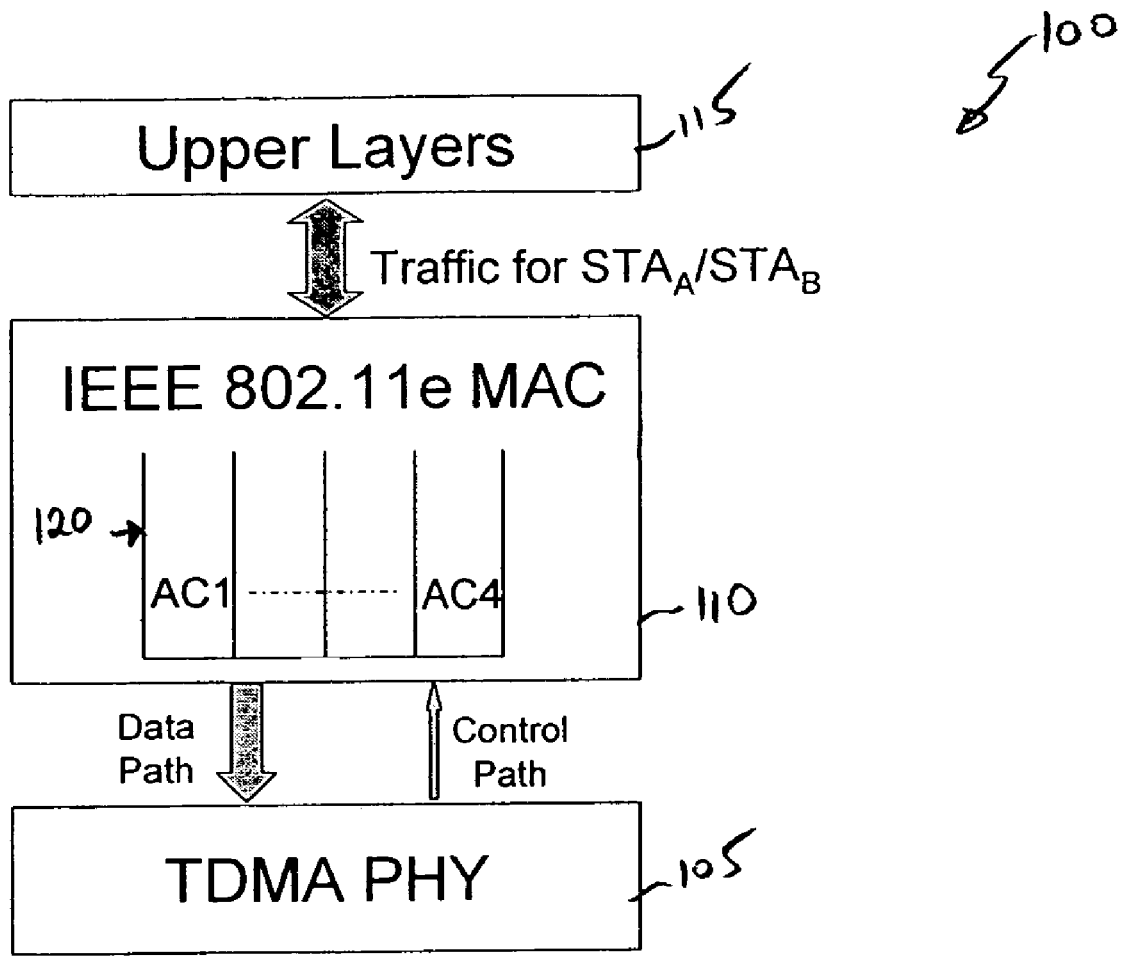
FIG. 1 is a block diagram of layers in a wireless access point implementing a TDMA-based physical layer, in accordance with the prior art.
Figure 2:
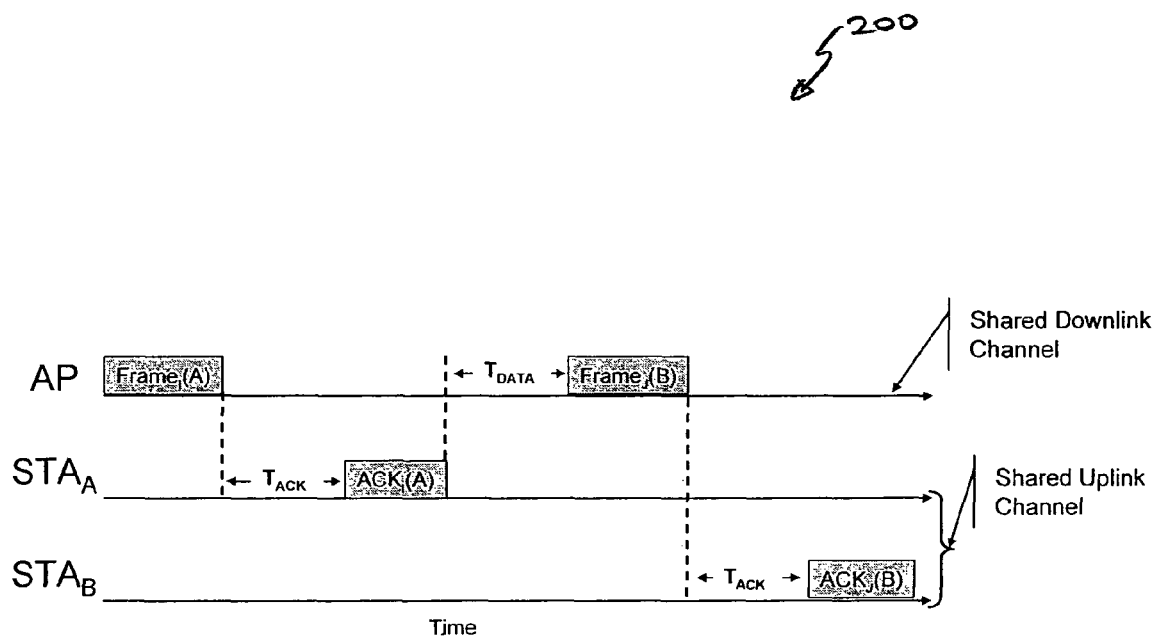
FIG. 2 is a timing diagram illustrating packet flow in a wireless network implementing a TDMA-based physical layer in accordance with the prior art.
Figure 3:
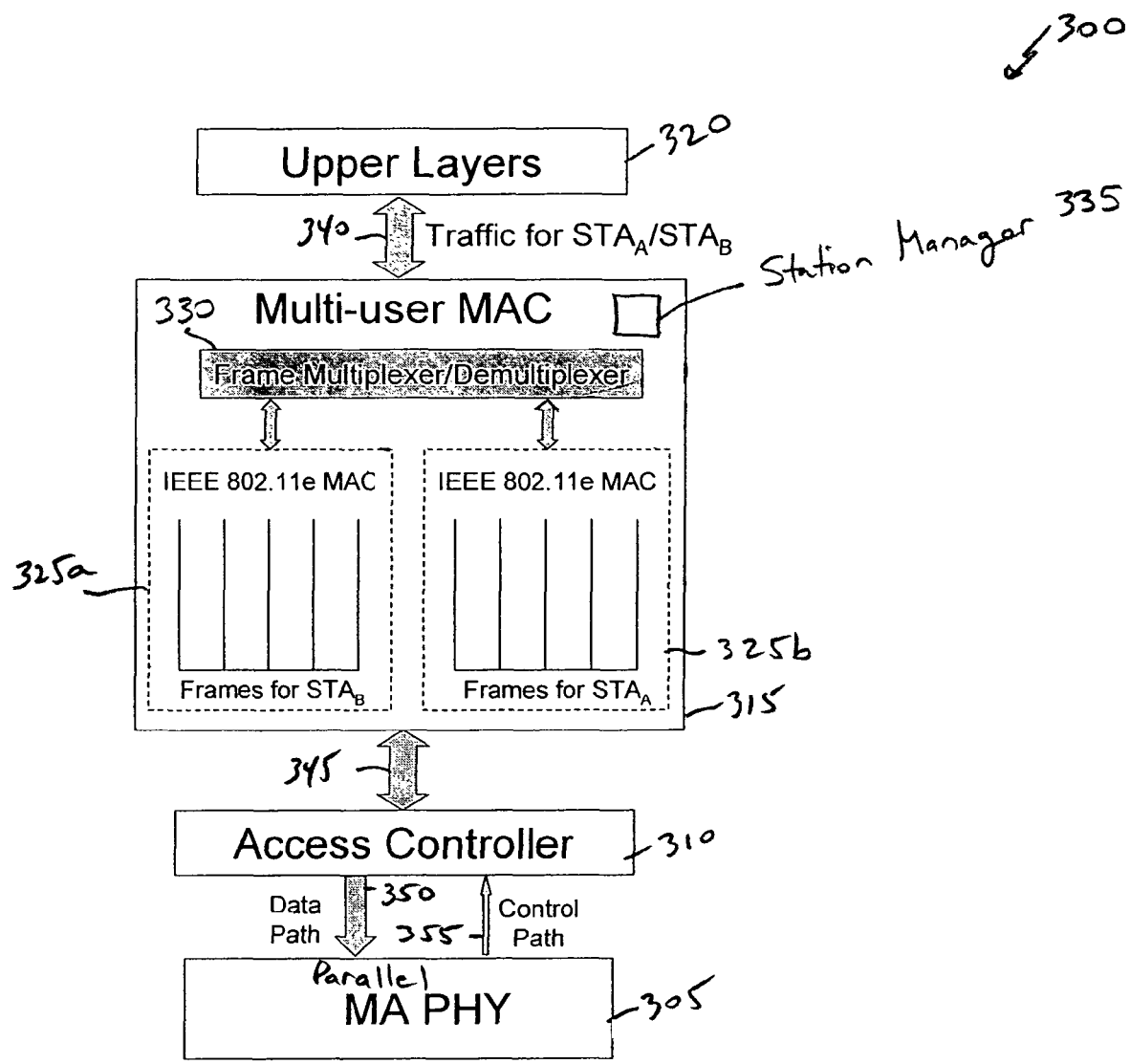
FIG. 3 is a block diagram of layers in a wireless access point implementing a parallel multiple access physical layer, in accordance with an embodiment of the present invention.

FIG. 3 is a block diagram of a wireless access point 300 implementing a parallel multiple access physical layer 305, in accordance with an embodiment of the present invention. Wireless access point 300 includes upper layers 320, a multi-user MAC layer 315 coupled to the upper layers 320, an access controller 310 coupled to the multi-user MAC layer 315, and a parallel multiple access physical layer 305 coupled to the access controller 310. The multi-user MAC layer 315 includes a station manager 335, two queue blocks 325a and 325b (each hereinafter generically referred to as a queue block 325), and a multiplexer/demultiplexer 330. The access controller 310 may be implemented as part of the MAC layer 315, part of the physical layer 305, or in between.

For simplicity, the wireless access point 300 is shown as configured for handling only two stations, namely, $STA_A$ and $STA_B$. However, the wireless access point 300 can be configured to support any number of stations.

Generally, the upper layers 320 receive frames destined for multiple client stations, in this case, $STA_A$ and $STA_B$. The upper layers 320 may receive the frames from a wired network. The upper layers 320 forward the frames to the multi-user MAC layer 315. The frame multiplexer/demultiplexer 330 reviews the destination address of the incoming frame, and routes the incoming frame to the appropriate queue block 325 based on its destination address. Each queue block 325 is dedicated to a single client station, e.g., $STA_A$ or $STA_B$, and functions independently of the other queue blocks 325. In this example, queue block 325a is dedicated to frames for station $STA_A$, and queue block 325b is dedicated to frames for station $STA_B$. Each queue block 325 operates to handle contention for the specific client station, in this case, according to IEEE 802.11e protocols. In an 802.11e embodiment, the frames may be classified within each queue block 325 into IEEE 802.11e ACs (e.g., video, voice, best effort and background) and a winning frame may be selected using IEEE 802.11e protocols.

The station manager 335 monitors the wireless network for active stations, possibly by monitoring transmitting station addresses. Upon detecting a newly active station, the station manager 335 may create an instance of a queue block 325 to be responsible for processing traffic for the newly active station. The station manager 335 also configures the frame multiplexer/demultiplexer 330 to manage the incoming frames for the newly active station, e.g., by associating the station address with the new instance of a queue block 325. Upon detecting inactivity of a previously active station, the station manager 335 may remove the associated queue block 325 now deemed unnecessary. In the example shown in FIG. 3, the station manager 335 has determined that two stations, namely, $STA_A$ and $STA_B$, are currently active. Accordingly, the station manager 335 has created two queue blocks, namely, queue blocks 325a and 325b and configured the multiplexer/demultiplexer 330 to handle the frames for the two stations.

In one embodiment, the station manager 335 may be capable of creating any number of instances of queue blocks 325, possibly limited only by functional limitations on such things as bandwidth, throughput, etc. In another embodiment, the station manager 335 may be capable of configuring only a predetermined number of instances of queue blocks 325, possibly limited by hardware constraints (and possibly by functional limitations on such things as bandwidth, throughput, etc.).

The MAC layer 315 forwards the frames winning each contention in each queue block 325 to the access controller 310. The access controller 310 selects frames from those winning their respective contentions to be forwarded to the physical layer 305 for transmission to the client stations. To avoid contention requirements in the uplink channel, the access controller 310 may assign acknowledgement ACK offsets to the selected winning frames. Thus, the client stations, e.g., $STA_A$ and $STA_B$, need not contend for access to the uplink channel to send their respective ACKs. Instead, the stations send their respective ACKs at times based on the ACK offsets. This ACK timing is shown and described with reference to FIGS. 4 and 5.

At times, the number of client stations (and thus queue blocks 325) may outnumber the channels available to the parallel multiple access physical layer 305. For example, there may be eight active stations and only four available channels. In such case, the access controller 310 may perform selection algorithms, possibly based on priority schemes, SNR schemes, station physical positions, station addresses, etc., to select winning frames for transmission in the first slot, frames for transmission in a second slot, etc., until all frames have been transmitted.

In the uplink direction, the wireless access point 300 may receive frames over only a single channel and thus may utilize conventional techniques.

Figure 4:
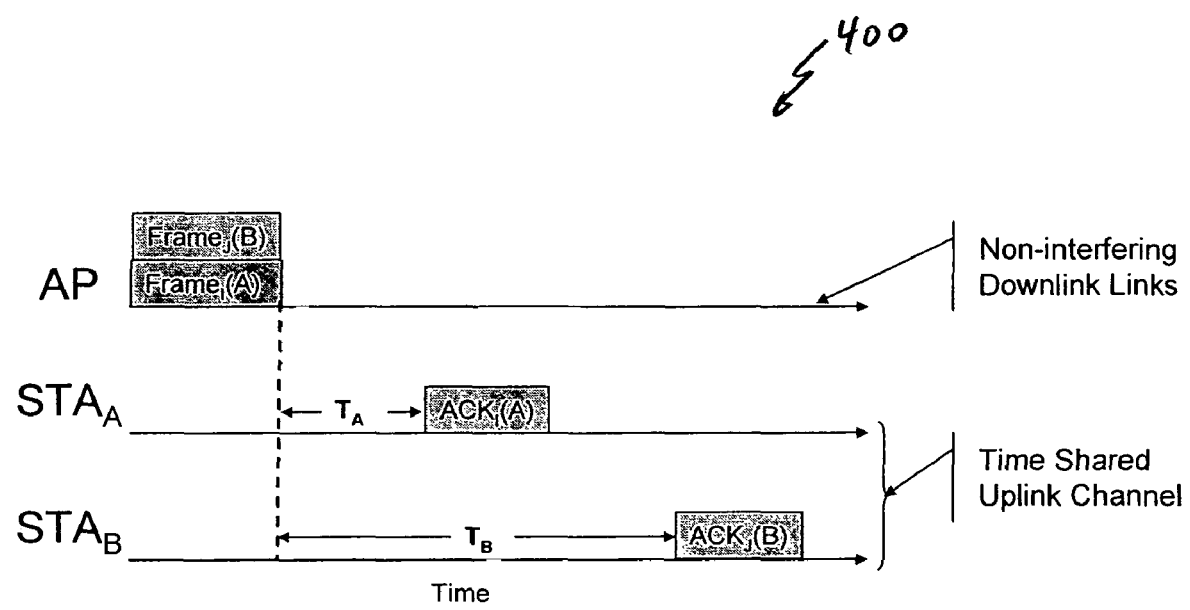
FIG. 4 is a timing diagram illustrating packet flow in a wireless network implementing a parallel multiple access physical layer, in accordance with an embodiment of the present invention.
Figure 5:
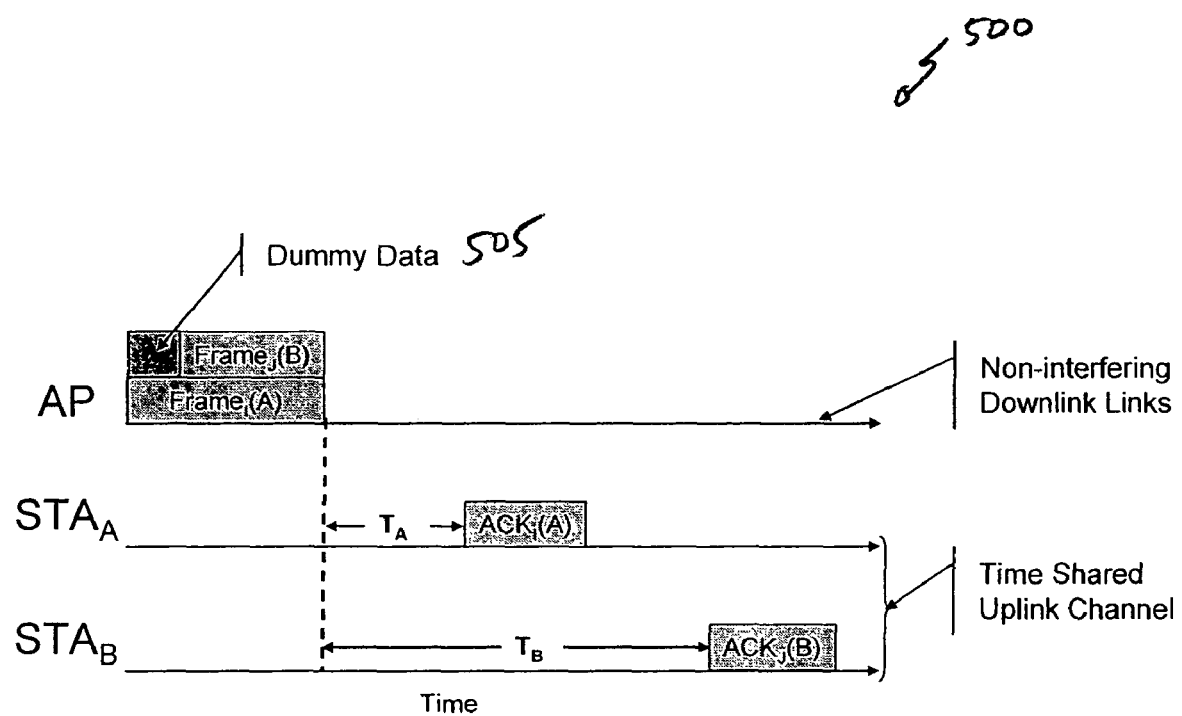
FIG. 5 is a timing diagram illustrating packet flow in a wireless network implementing a parallel multiple access physical layer, in accordance with another embodiment of the present invention.

FIG. 4 is a timing diagram 400 illustrating packet flow in a wireless network in which the AP implements a parallel multiple access physical layer, in accordance with an embodiment of the present invention. Frames, namely, $FRAME_j(A)$ from station $STA_A$ and $FRAME_j(B)$ from $STA_B$, are transmitted simultaneously over non-interfering PHY links. Each frame specifies a time offset instructing the receiving station when to send its acknowledgement ACK. As shown, $STA_A$ waits time offset $T_A$ before sending $ACK_j(A)$ and $STA_B$ waits time offset $T_B$ before sending $ACK_j(B)$. If the transmitted frames are of unequal size, dummy data 505 may be appended to the appropriate frame(s) to make the frame sizes equal, e.g., as shown in the example timing diagram 500 of FIG. 5. Other alternatives are possible, such as appending the dummy data on the trailing side of the $FRAME_j(B)$. Generally, the timing diagrams 400 and 500 show non-interfering downlink (AP to non-AP stations) links and time-shared uplink (non-AP station to AP) links.

Figure 6:
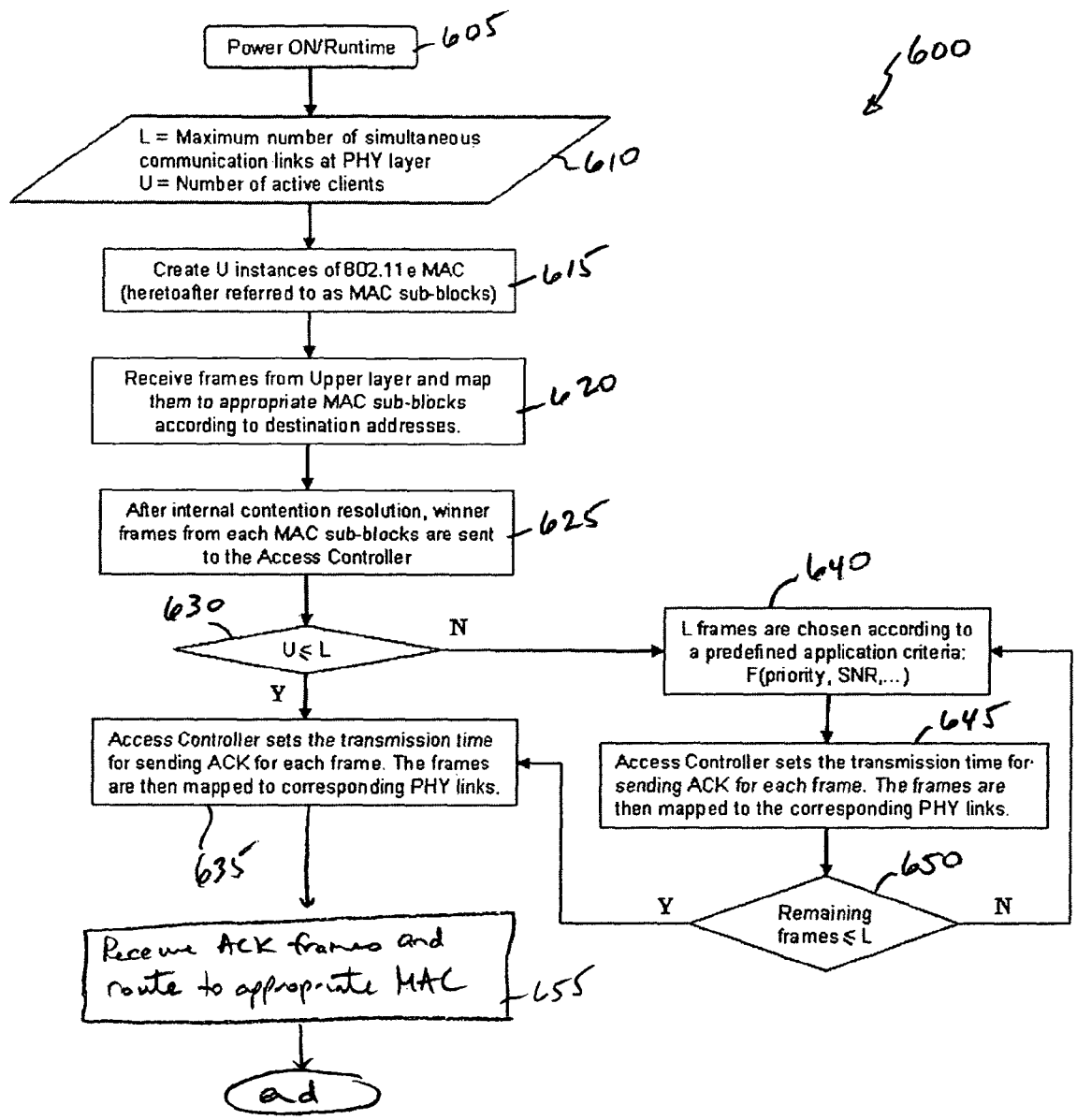
FIG. 6 is a flowchart illustrating a method of managing multiple users in a wireless access point implementing a parallel multiple access physical layer, in accordance with an embodiment of the present invention.

FIG. 6 is a flowchart illustrating a method 600 of managing multiple stations by a wireless access point 300 implementing a parallel multiple access physical layer 305, in accordance with an embodiment of the present invention. Method 600 begins at power-on or during runtime 605. The station manager 335 in step 610 determines the number U of active client stations, e.g., by reviewing the addresses of the stations currently transmitting or having transmitted within a predetermined amount of time (or predetermined number of slots). The station manager 335 in step 615 creates U instances of the queue blocks 325, and configures the frame multiplexer/demultiplexer 330 to serve the U active client stations.

The frame multiplexer/demultiplexer 330 in step 620 receives frames from the upper layers 320 and routes them to the appropriate queue blocks 326 (referred in FIG. 6 as MAC sub-blocks) according to their destination addresses. Each queue block 325 in step 625 performs contention-based protocols to select a winning frame, and then forwards the winning frame to the access controller 310. The access controller 310 in step 630 determines if the number U of active client stations (i.e., the number U of winning frames) is greater than the number L of possible simultaneous channels supported by the parallel multiple access physical layer 305.

If the number U of winning frames is less than or equal to the number L of possible simultaneous channels (U< or =L), then the access controller 310 in step 635 sets the offset time associated with each winning frame to inform the client station when to send the acknowledgement ACK frame, and routes the frames to the physical layer 305 for simultaneous transmission (e.g., using SDMA or FDMA). The access controller 310 in step 655 waits to receive acknowledgements ACKs at the times prescribed by the time offsets from the client stations in response to the transmitted winning frames, and forwards the ACKs upon receipt to the appropriate queue blocks 325. Method 600 then ends.

If the number U of winning frames is greater than the number L of possible simultaneous channels (U>L), then the access controller 310 in step 640 selects a subset, e.g., L frames, of the U winning frames for transmission. The subset of winning frames may be selected according to predefined criteria, e.g., based on priority algorithms, signal to noise ratios, station physical positions, station addresses, etc. The access controller 310 in step 645 sets the offset time associated with each selected frame to inform the client station when to sends its ACK, and routes the subset of winning frames to the physical layer 305 for transmission. The access controller 310 in step 650 determines if the number L of available channels is equal to or exceeds the number R of remaining frames. If so (R< or =L), then the method 600 returns to step 635 to send the remaining R frames. If not (R>L), then the method 600 returns to step 640 to select a subset of remaining winning frames, e.g., L more frames, according to the same or other predetermined criteria.

Figure 7:
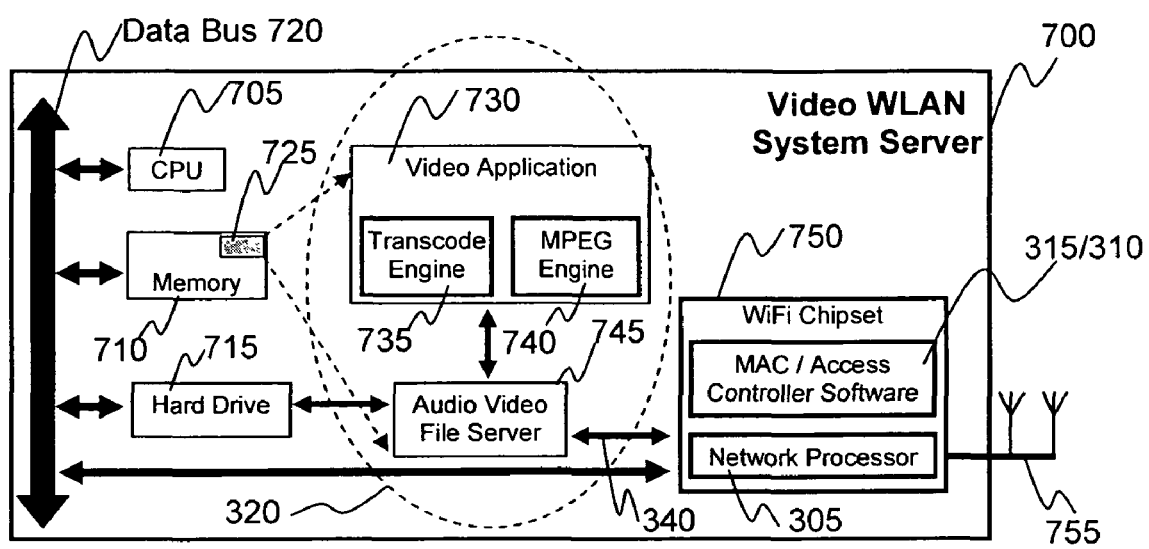
FIG. 7 is a block diagram illustrating an example video WLAN system server, in accordance with an embodiment of the present invention.

FIG. 7 is a block diagram illustrating an example video WLAN system server 700, in accordance with an embodiment of the present invention. The WLAN system server 700 includes a CPU 705, memory 710, a hard drive 715 and a WiFi Chipset 750, each coupled to a data bus 720. The memory 710 stores programs including a video application 730 containing a transcode engine 735 and/or an MPEG engine 740 and including an audio/video file server (AVFS) 745. The WiFi chipset 750 (e.g., PCI card) includes MAC/access-controller software 315/310 and a network processor 305 (e.g., parallel MA physical layer 305) coupled to wireless antenna 755.

The CPU 705 communicates with different components using the data bus 720. The video application 730 runs on the memory 710 and interacts with the AVFS 745, which also runs on the memory 710. Via the data bus 720, the AVFS 745 accesses a video file stored on the hard drive 725. The AVFS 745 also interacts with the WiFi chipset 750. MPEG frames, e.g., encapsulated in multiple RTP frames, are forwarded to the MAC layer 315. The MAC layer 315 uses the frame multiplexer (see element 330 of FIG. 3) to assign the frames to appropriate queues (see elements 325 of FIG. 3), which may be by the EDCA processes. The access controller 310 selects the winning frames, which the MAC layer 315 passes to the network processor 305 for transmission.

Typical application scenarios include in-flight multimedia entertainment systems (e.g., several multimedia servers serving several video clients over wireless LAN), wireless gaming (e.g., several players connected to a multimedia server over wireless LAN), and home video systems (e.g., a multimedia server serving several wireless HD TVs over wireless LAN).

Figure 8:
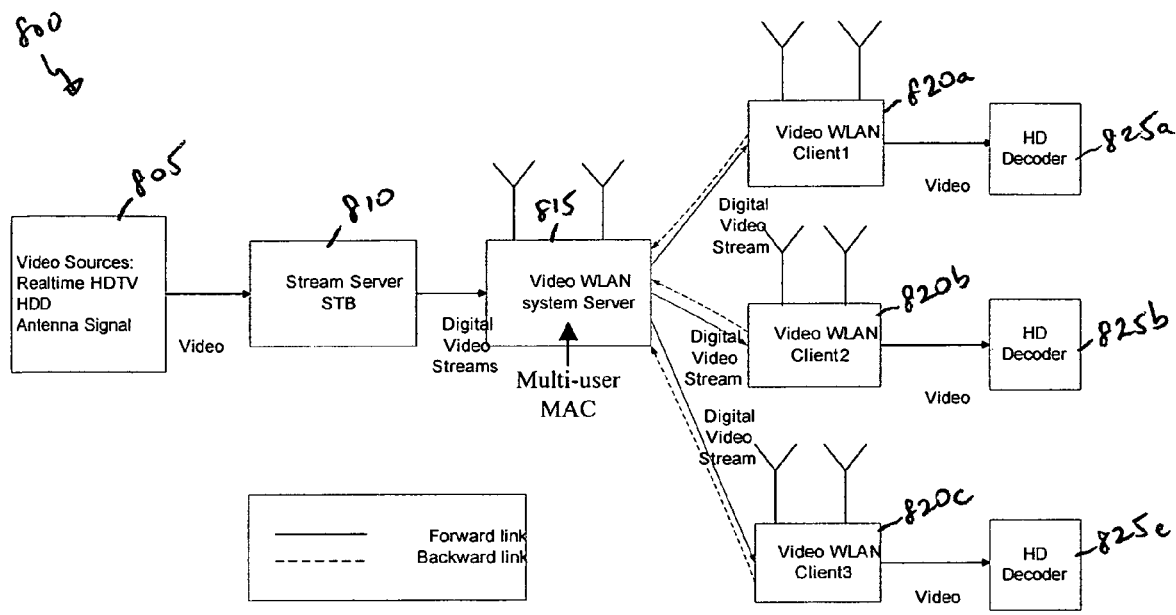
FIG. 8 is a block diagram illustrating an example application network, in accordance with an embodiment of the present invention.

FIG. 8 is a block diagram illustrating an example application network 800, in accordance with an embodiment of the present invention. Application network 800 includes video sources (e.g., real-time HDTV, a hard disk drive, an antenna signal) 805 sending a video signal to a stream server set top box (STB) 810. The stream server STB 810 sends digital video streams to a video WLAN system server 815, which simultaneously sends digital video streams to multiple video WLAN clients 820a-820c (each hereinafter referred to generally as WLAN client 820) using point-to-multiple transmission. Each WLAN client 820 sends its digital video stream to its HD decoder 820 for conversion to a playback signal (e.g., HDTV signal).

The foregoing description of the preferred embodiments of the present invention is by way of example only, and other variations and modifications of the above-described embodiments and methods are possible in light of the foregoing teaching. Embodiments of the invention can be used in wired or wireless networks, including broadband wireless networks, wireless local area networks, or mesh networks. The various embodiments set forth herein may be implemented utilizing hardware, software, or any desired combination thereof. For that matter, any type of logic may be utilized which is capable of implementing the various functionality set forth herein. Components may be implemented using a programmed general purpose digital computer, using application specific integrated circuits, or using a network of interconnected conventional components and circuits. The embodiments described herein are not intended to be exhaustive or limiting. The present invention is limited only by the following claims.

The invention claimed is:

1. A method implementing a multi-user media access control (MAC) layer in a broadband wireless access network, the method comprising:
    creating, at the multi-user MAC layer, a queue block dedicated to one or more active stations in the broadband wireless access network;
    receiving frames at a layer above the multi-user MAC layer, each frame having a destination address identifying an active station;
    routing each frame to a queue block at the multi-user MAC layer based on the destination address;
    performing a contention-based process by each queue block having at least one frame at the multi-user MAC layer;
    receiving, at an access controller, a winning frame from each queue block that performs the contention-based process;
    when the number of one or more winning frames is equal to or below a threshold greater than one, then forwarding the one or more winning frames to a physical layer for simultaneous transmission to the one or more active stations; and
    when the number of the one or more winning frames is above the threshold, then forwarding a subset of the one or more winning frames to the physical layer for simultaneous transmission to the one or more active stations,
    wherein the contention-based process is performed at each queue block and includes an IEEE802.11e process which provides quality of service (QoS) differentiation by grouping data traffic in the broadband wireless access network into four access classes including voice, video, best effort, and background; and
    wherein the voice access class has the highest priority, the video access class has the second highest priority, the best effort access class has the third highest priority, and the background access has the lowest priority.

2. The method of claim 1,
    wherein the method is performed by a wireless access point.

3. The method of claim 1, wherein the threshold is related to the number of simultaneous channels available to the physical layer.

4. The method of claim 1, wherein the subset of the one or more winning frames includes a number of frames equal to the threshold.

5. The method of claim 1, further comprising instantiating queue blocks based on the number of the one or more active stations.

6. The method of claim 1, further comprising
    when a difference between the number of the one or more winning frames and the threshold is greater than the threshold, then forwarding another subset of the one or more winning frames to the physical layer for simultaneous transmission to the one or more active stations during a subsequent time slot.

7. The method of claim 1, further comprising
    when a difference between the number of the one or more winning frames and the threshold is less than or equal to the threshold, then forwarding the one or more winning frames to the physical layer for simultaneous transmission to the one or more active stations during a subsequent time slot.

8. The method of claim 1, further comprising
associating with the one or more winning frame to be forwarded to the physical layer a time offset that informs the one or more active stations when to send an acknowledgement (ACK) frame, thus enabling a time shared uplink for acknowledgement (ACK) frames without contention.

9. The method of claim 1,
wherein at least two winning frames to be forwarded to the physical layer have different sizes, one frame being smaller and one frame being larger; and
further comprising appending dummy data to the smaller frame so that the smaller frame with dummy data is the same size as the larger frame.

10. The method of claim 1,
wherein each queue block is created to be dedicated to only one active station and to function independently of other queue blocks.

* * * * *